US012591896B2

(12) United States Patent     (10) Patent No.: US 12,591,896 B2

Widyaratne et al.     (45) Date of Patent: Mar. 31, 2026

(54) SYSTEM AND METHOD FOR TOKEN-BASED TRADING OF CARBON CREDITS

(71) Applicants: Sanjeewa Widyaratne, Austin, TX (US); Dominik Widyaratne, Austin, TX (US); Lorenzo Widyaratne, Austin, TX (US)

(72) Inventors: Sanjeewa Widyaratne, Austin, TX (US); Dominik Widyaratne, Austin, TX (US); Lorenzo Widyaratne, Austin, TX (US)

(*) Notice: Subject to any disclaimer, the term of this patent is extended or adjusted under 35 U.S.C. 154(b) by 34 days.

(21) Appl. No.: 18/291,481

(22) PCT Filed: Jul. 25, 2022

(86) PCT No.: PCT/US2022/074105
§ 371 (c)(1),
(2) Date: Jan. 23, 2024

(87) PCT Pub. No.: WO2023/009978
PCT Pub. Date: Feb. 2, 2023

(65) Prior Publication Data
US 2024/0346521 A1    Oct. 17, 2024

Related U.S. Application Data

(60) Provisional application No. 63/225,658, filed on Jul. 26, 2021.

(51) Int. Cl.
*G06Q 30/018*    (2023.01)
*G07C 5/00*    (2006.01)

(52) U.S. Cl.
CPC ........... *G06Q 30/018* (2013.01); *G07C 5/008* (2013.01)

(58) Field of Classification Search
CPC ........ G06Q 30/018; G06Q 50/10; Y02P 90/84
See application file for complete search history.

(56) References Cited

U.S. PATENT DOCUMENTS 11,210,751 B2 * 12/2021 Anglin .............. H02J 13/00002
2005/0246190 A1 11/2005 Sandor et al.
(Continued)

OTHER PUBLICATIONS

Venkat Sumantran; Charles Fine; David Gonzalvez, "A Softer, Greener Footprint," in Faster, Smarter, Greener: The Future of the Car and Urban Mobility, MIT Press, 2017, pp. 43-71 (Year: 2017).*
(Continued)

*Primary Examiner* — Michael P Harrington
(74) *Attorney, Agent, or Firm* — Perilla Knox & Hildebrandt LLP; Kenneth A. Knox

(57) ABSTRACT

A system and method for trading of carbon credits is provided. The system comprises a server computing device comprising at least one hardware processor and memory; program instructions stored in the memory and executable in the server computing device that, when executed, direct the server computing device to: communicate with a plurality of vehicles over a communication network; receive distance information from a respective one of the vehicles detailing distance traveled by the respective one of the vehicles; generate a carbon credit based at least in part on the distance information received from the respective one of the vehicles; and associate the carbon credit with a user account associated with the respective one of the vehicles.

24 Claims, 8 Drawing Sheets

(56)     References Cited

U.S. PATENT DOCUMENTS

| 2008/0015976 | A1  |  1/2008 | Sandor et al. |
| 2010/0235008 | A1* |  9/2010 | Forbes, Jr. ............. G06Q 10/00 |
| | | | 700/297 |
| 2015/0324807 | A1* | 11/2015 | Pacheco ............... G06Q 30/018 |
| | | | 705/317 |
| 2017/0103468 | A1  |  4/2017 | Orsini et al. |
| 2018/0012196 | A1  |  1/2018 | Ricci et al. |
| 2022/0122172 | A1* |  4/2022 | Nguyen ............. H04L 63/0861 |

OTHER PUBLICATIONS

International Search Report for International Application No. PCT/US2022/074105.
Written Opinion for International Application No. PCT/US2022/074105.

* cited by examiner

800

Communicating, by at least one computing device comprising at least one hardware processor, with a plurality of vehicles over a communication network      802

Receiving, by the at least one computing device, distance information from a respective one of the vehicles detailing distance traveled by the respective one of the vehicles      804

Generating, by the at least one computing device, a carbon credit based at least in part on the distance information received from the respective one of the vehicles      806

Associating, by the at least one computing device, the carbon credit with a user account associated with the respective one of the vehicles      808

FIG. 8

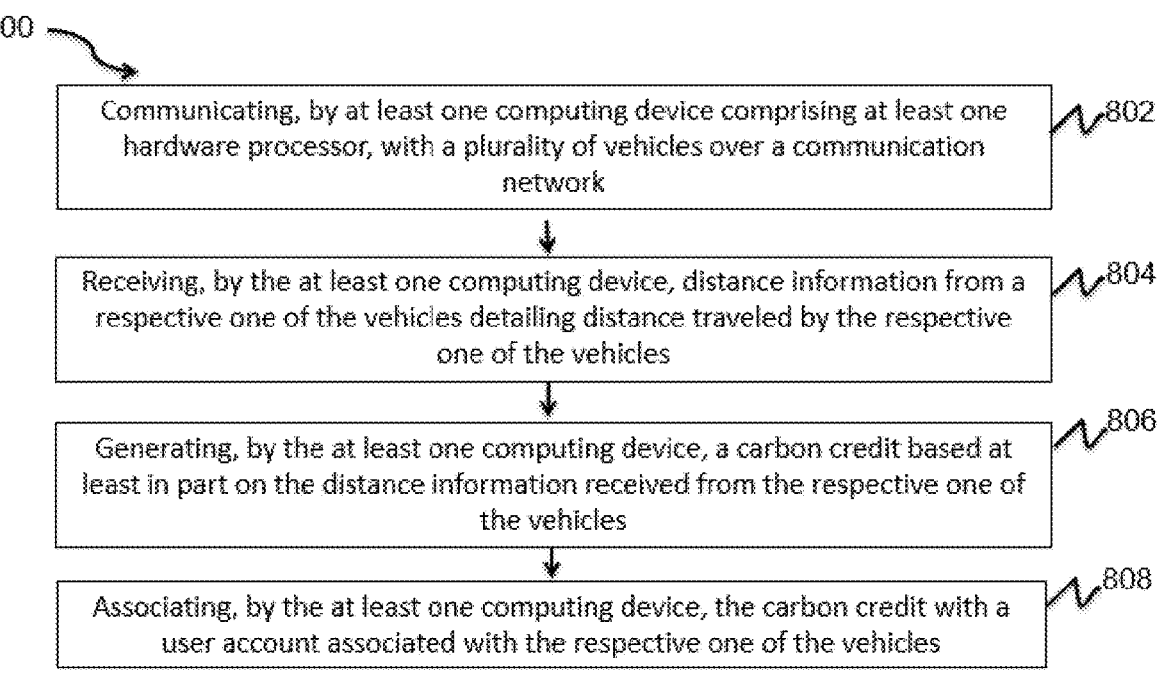

906

904

900

Server Computing Device 902

Vehicle Computing Device 908a

At Least One Hardware Processor 908a

Plurality Of Home Internet-of-thing (IOT) Devices 910

At Least One Hardware Processor 902a

Memory 908b

Renewable Energy Source 912

Memory 902b

FIG. 9

SYSTEM AND METHOD FOR TOKEN-BASED TRADING OF CARBON CREDITS

CROSS-REFERENCE TO RELATED APPLICATIONS

This application is a national phase application under 35 U.S.C. § 371 of International Application No. PCT/US2022/074105 filed Jul. 25, 2022 entitled "SYSTEM AND METHOD FOR TOKEN-BASED TRADING OF CARBON CREDITS," which claims the benefit of and priority to U.S. Provisional Patent Application No. 63/225,658 entitled "SYSTEM AND METHOD FOR TOKEN-BASED TRADING OF CARBON CREDITS," filed Jul. 26, 2021, the contents of which being incorporated by reference in their entirety herein.

FIELD OF THE INVENTION

The present invention relates to a system and method useful in the control and limit of greenhouse gas emissions by the trading and accounting for environmental offsets, and more particularly, to a system and method for trading of carbon credits between individuals, institutional investors and countries through an online communication network.

BACKGROUND

Global warming has become a global problem due to the global temperature rise caused by the increase in carbon dioxide, which is a Greenhouse Gas (GHG). The Greenhouse Gases (GHGs) are gases that increase the temperature of the atmosphere by absorbing infrared radiation generated from the Earth's surface. Typically, the greenhouse gases include carbon dioxide ($CO_2$), methane ($CH_4$), nitrous oxide ($N_2O$), chlorofluorocarbons (CFCs), ozone ($O_3$) and water vapor ($H_2O$). Greenhouse gases are generally transparent to solar radiation but opaque to long wave radiation, thus preventing long wave radiation energy from leaving the atmosphere. The net effect of greenhouse gases in the atmosphere is a trapping of absorbed radiation and a tendency to warm the earth's surface. Greenhouse gases raise the global average temperature, which can be a major cause of global warming. In addition, due to global warming, sea level rises, subtropical vegetation increases, and forest distribution regions disappear.

In order to solve the problem caused by global warming, countries around the world signed the United Nations Framework Convention on Climate Change (UNFCCC) in 1992. In addition, through the Kyoto Protocol adopted in 1997 and entered into force in 2005, it has been obligated to reduce the emission of six greenhouse gases including carbon dioxide. The Kyoto Protocol introduced systems such as Joint Implementation (JI), Clean Development Mechanism (CDM), and Emission Trading (ET).

The idea of trading of carbon credits ("carbon units") to reduce overall emissions was introduced under the Kyoto Protocol, which was adopted in Kyoto, Japan in 1997 and came into force in 2005. The mechanisms that regulate the Carbon Credits market were established in the Marrakesh Accords. The carbon credit limits the emission to one tonne of carbon dioxide or the mass of another greenhouse gas with a carbon dioxide equivalent (tCO2e) corresponding to one tonne of carbon dioxide. In other words, 1 carbon credit corresponds to 1 metric tonne of carbon dioxide prevented from entering the atmosphere. Entities running low carbon-emissions or emissions free power generation or industrial processes may be eligible to receive/save carbon credits, which they can sell on to entities (e.g. manufacturers, power companies, etc.) who are emitting more than their quota of carbon dioxide in order to offset these excess emissions.

The Kyoto Protocol establishes the quotas of greenhouse gases (denominated in individual units) that each developed country can emit. These so-called Assigned Amount Units (AAUs) correspond to an allowance to emit one metric tonne of $CO_2$ or equivalent greenhouse gas. Each country then divides its quotas assigning them to local businesses and organizations, setting in this way a limit on the emissions of $CO_2$ for each of them.

There are two types of carbon credits available. A Certified Emission Reduction (CER) is a carbon unit traded within the compliance market, in which entities are legally obliged to meet certain carbon dioxide emission quotas. A Voluntary Emission Reduction (VER) is a carbon unit traded in the voluntary market, which is proving to be very popular with entities looking to be seen as environmentally friendly.

The carbon credits can be issued by any government or other regulating body willing to limit the carbon dioxide emissions. Carbon trading follows the principle of an emissions trading (or "cap and trade") approach, i.e. a market-based approach in which economic incentives are given to encourage reductions in the emissions of pollutants. One of the positive aspects of this approach is that organizations can decide to use the emissions trading schemes in a flexible way, finding the best option to meet policy targets.

In different countries, surpluses and shortages of the reduction goals are made up for carbon credit trading between companies, businesses, investors and countries to achieve the reduction goals and thus the economic value for carbon credit is created and authorized. Among these countries and/or companies, the Emissions Trading Scheme is carried out on the basis of amount of GHG emissions are generated. For example, if GHG emissions are less than the GHG emission limit granted to the country, the remaining amount of GHG emissions can be transferred to other countries that exceed the GHG emission limit. In addition, it is a system that stipulates that allowances for excess emissions can be transferred from other countries/companies.

Currently, various systems and approaches are available for trading of carbon credits. These existing systems and approaches for trading of carbon credits having different barriers to greenhouse gas trading include regulatory uncertainty; lack of a clear, widely-accepted definition of the commodity; lack of standards for monitoring, verification, and trade documentation; lack of standards for eligibility of project-based emission offsets and lack of organized markets and clear market prices. These barriers constitute significant transaction costs that impede progress in adoption of greenhouse gas reduction commitments by raising the costs of achieving such commitments.

Moreover, the existing carbon credits trading systems are not capable of calculating individual carbon emissions, updating carbon credits and transacting with other individuals or end users, companies, and countries. These systems facilitate only companies and organizations for trading of carbon credits. As a result, individuals and/or end users cannot invest even if they want to invest in carbon credits. The reason for this impossibility is to open an account in the national registry in order to trade carbon credits. Due to the complexity of the process and the various constraints, individuals have limitations in opening an account. there is a situation where everyone cannot easily analyze and summarize because it is not possible to easily collect and manage carbon dioxide emission data in detail There is an urgent need for measures to enable guidance and control of emissions to prevent global warming.

There is a situation where everyone (like individuals, companies, countries, government agencies, etc.) cannot easily analyze and summarize because it is not possible to easily collect and manage carbon dioxide emission data in detail. There is an urgent need for measures to enable guidance and control of emissions to prevent global warming.

As a means for solving the aforementioned problems, the present invention provides a platform that enables the fair trading of carbon credits via a network based on the carbon dioxide (GHGs) emission for individuals, companies, countries, government agencies, etc. It also facilitates to transfer carbon credits between individual users, corporate users and state users. It provides a customizable platform for the end users or individuals for trading of carbon credits.

An object of the present invention is to provide a system capable of calculating individual carbon emissions, calculating carbon credits based on carbon emissions, updating carbon credits, and transacting with other individuals, companies, and countries. The trading and redemption facilitated by the present invention is secure, private, efficient, fast and transparent.

The present invention facilitates the carbon credits to be tokenised and entered a digital contract through a payment network platform, for example, but not limited to, stellar platform. Each transaction uses the blockchain technology for transparent, secure transactions. The present invention provides a platform to allow trading between all kinds of digital assets, improving liquidity and making it easy for buyers to do the transaction in any currency. Since the transactions uses blockchain technology in a decentralized way so that no single organisation or group has control over trading rather, all users in this network collectively retain control. The speed of transaction can be achieved between 3-5 seconds which is faster in any blockchain platform. The $CO_2$ usage per transaction is very less compared to all transaction based platform which is so special for the current platform.

BRIEF SUMMARY

This section provides a general summary of the disclosure and is not a comprehensive disclosure of its full scope or all of its features.

The present invention provides a system, includes a server computing device comprising at least one hardware processor and memory; program instructions stored in the memory and executable in the server computing device that, when executed, direct the server computing device to communicate with a plurality of vehicles over a communication network; receive distance information from a respective one of the vehicles detailing distance traveled by the respective one of the vehicles; generate a carbon credit based at least in part on the distance information received from the respective one of the vehicles; and associate the carbon credit with a user account associated with the respective one of the vehicles.

One aspect of the present invention a system for trading of carbon credits, the system comprising: a server to allow the plurality end users to connect, register and select carbon credits for purchase, sell and pay; a communication network coupled to the server configured to connect the plurality of end users to the server; a mileage verification module to calculate and manage the mileage of the vehicle corresponding to carbon emission and update the server about the carbon credits earned by the user(s) through the communication network; and a KWH Confirmation Module to calculate the power savings for each load from the power usage information for each load according to a predetermined criterion.

One aspect of the present invention provides a system for trading of carbon credits, comprising a server having: an interface for receiving and sending information indicating a user's carbon saving; a memory unit for storing programs and application data; a storage module to store the database of the different end users; a control unit to control the overall operation of trading of carbon credits, the control unit having: a customer information management module for managing information of a customer/individuals/end users using a carbon credit transaction service; a carbon emission calculation module that calculates carbon emission information from power/energy usage information for each customer load; a carbon credit certification module for acquiring an authorized carbon credit for the carbon credit information; a carbon credit settlement module for calculating a compensation amount according to the obtained carbon credit sell; and a payment calculator module comprising a processor and memory, the memory configured to receive the information from the input, the processor operable to calculate and output a value indicating a cost of a selected portion of the user's carbon credit sales.

Another aspect of the present invention provides a vehicle, includes a vehicle computing device comprising at least one hardware processor and memory; program instructions stored in the memory and executable in the vehicle computing device that, when executed, direct the vehicle computing device to: communicate with a server computing device over a communication network; generate distance information detailing distance traveled by the vehicle; transmit the distance information to the server computing device over the communication network; and associate a carbon credit generated at least in part on the distance information with a user account associated with the vehicle.

Another aspect of the present invention provides a computer-implemented method, includes of communicating, by at least one computing device comprising at least one hardware processor, with a plurality of vehicles over a communication network; receiving, by the at least one computing device, distance information from a respective one of the vehicles detailing distance traveled by the respective one of the vehicles; generating, by the at least one computing device, a carbon credit based at least in part on the distance information received from the respective one of the vehicles; and associating, by the at least one computing device, the carbon credit with a user account associated with the respective one of the vehicles.

Another aspect of the present invention provides a method of creating and trading of carbon credits in a registered platform. The method comprises: providing a control unit, memory device, at least one user interface, and a communication network arranged in an online trading platform; registering, in a database in the memory device and via the communication network, one or more offset credits to respective users thereof; performing calculation of carbon offset and display cost of the carbon offset; accepting a user input indicating a percentage or proportion of the carbon offset and calculate the cost of this; and processing electronic transaction to receive payment from the user and allocate the purchased carbon credits to a project.

Further areas of applicability will become apparent from the description provided herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings:

FIG. 8 shows a flow chart for computer-implemented method according to another aspect of the present invention.

FIG. 9 shows a block diagram for working between vehicle and system through communication network according to another aspect of the present invention.

DETAILED DESCRIPTION

Figure 1:
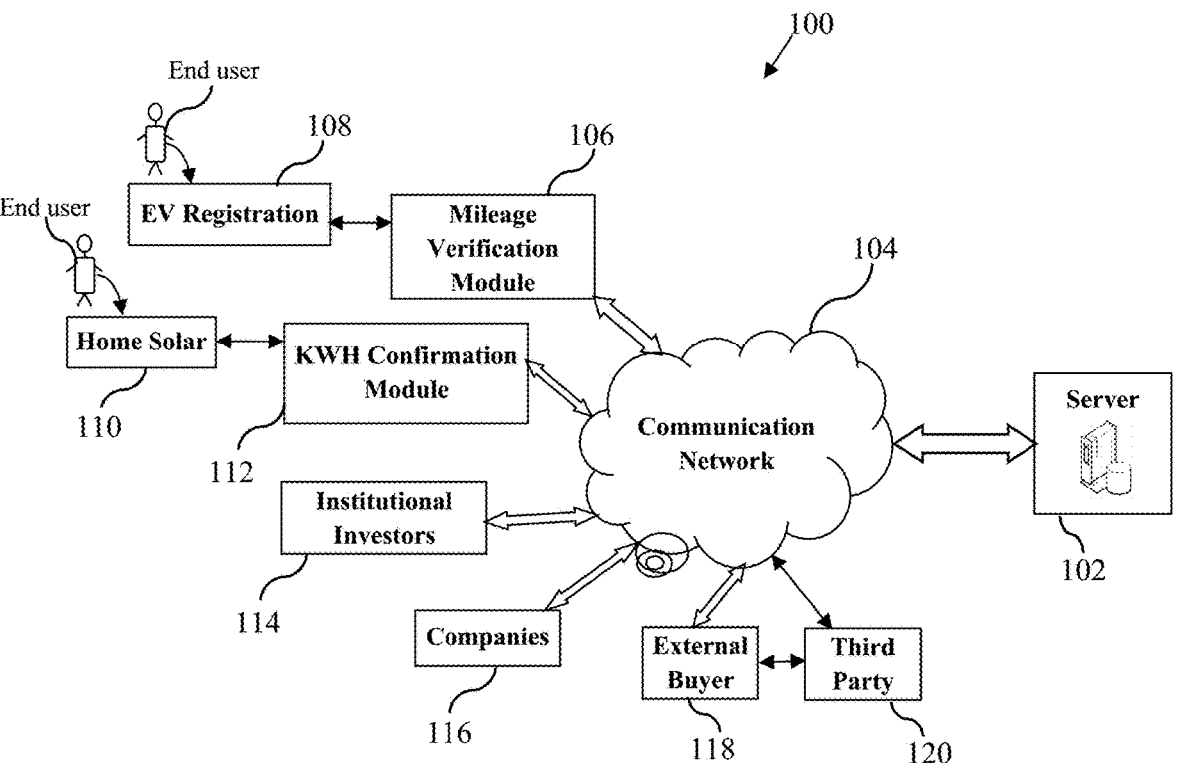
FIG. 1 shows a schematic block diagram illustrating a carbon credit trading system according to an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in detail, so as not to unnecessarily obscure aspects of the embodiments of the invention.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The present invention may be implemented with various changes without departing from the spirit, and may have one or more embodiments. In the present invention, the embodiments described in "specific details for carrying out the invention" and "drawings" are examples for specifically describing the present invention, and do not limit or limit the scope of the present invention.

The embodiment of the present invention provides a platform that enables the end user for fair trading of carbon credits via a network based on the carbon dioxide (GHGs) emission. It also facilitates to transfer carbon credits between individual users, corporate users and state users. It provides a customizable platform for the end users or individuals for trading of carbon credits.

The present invention facilitates the carbon credits to be tokenised and entered a digital contract through stellar platform. Each transaction uses the blockchain technology for transparent, secure transactions. The present invention provides a platform to allow trading between all kinds of digital assets, improving liquidity and making it easy for buyers to do the transaction in any currency. Since the transactions uses blockchain technology in a decentralized way so that no single organisation or group has control over trading rather, all users in this network collectively retain control. The speed of transaction can be achieved between 3-5 seconds which is faster in any blockchain platform. The $CO_2$ usage per transaction is very less compared to all transaction based platform which is so special for the current platform.

FIG. 1 shows a schematic block diagram illustrating a carbon credit trading system according to an embodiment of the present invention. Referring to FIG. 1, the carbon credit trading system 100 comprises a server 102 to allow end users to connect, register, and select carbon credits for purchase, sell and pay, a communication network 104 configured to connect the plurality of end users to the server, plurality of end users like electric vehicle (EV) registration 108, home solar 110, institutional investors 114, companies 116, external buyers 118 and third party 120 connected to the server 102 through the communication network 104 for trading of carbon credits.

The server 102 comprises a control unit to control the overall operation of trading of carbon credits, a memory unit for storing programs and data, a storage module to store the database/profile of the different end users (like their carbon credit score, available carbon credits, login ID and password credentials etc.). The control unit may include a customer information management module for managing information of a customer/individuals/end users using a carbon credit transaction service, a carbon emission calculation module that calculates carbon emission information from power/energy usage information for each customer load, a carbon credit certification module for acquiring an authorized carbon credit for the carbon credit information, a carbon credit settlement module for calculating a compensation amount according to the obtained carbon credit sell, and a payment calculator module comprising a processor and memory, the memory configured to receive the information from the input, the processor operable to calculate and output a value indicating a cost of a selected portion of the user's carbon credits.

The storage module is operatively coupled control unit and includes structured database configured to store information relating to multiple environmental offsets established in the same or in multiple different offset markets. The storage module may include a storage device to store data. Storage devices include hard disk drives, optical disc drives, magnetic tapes, floppy disks, flash memory, and solid state drives (SSDs). It may be a nonvolatile memory device or a volatile memory device such as a random access memory (RAM). The memory device is not limited thereto, and may be another type of memory device.

The memory unit is used for storing programs and applications. The application software is, for example, stored on the memory unit of the computer system/control unit. The memory unit is, for example, a random access memory (RAM) or another type of dynamic storage device that stores information and instructions for execution by the control unit. The memory unit also stores temporary variables and other intermediate information used during execution of the instructions by the control unit. The computer system further comprises a read only memory (ROM) or another type of static storage device that stores static information and instructions for the control unit.

The communication network 104 may be an Internet, an intranet, an extranet, or like distributed communication platform connecting computing devices over wired and/or wireless connections. As is known to those skilled in the art, the plurality of end users (like individuals, companies, institutional investors etc.) having their own devices to connect to the server 102. The end user device(s) and the server each include a processor, computer-readable medium or memory and input-output devices including devices for facilitating communication over the network 104. The communication network 104 may be a local area network (LAN), a wide area network (WAN), a cellular network, a satellite network, etc.

In the proffered embodiment of the present invention, the end users having the electric vehicle may earn the carbon credit and register themselves on the platform for carbon credits trading as shown in FIG. 1. The Electric Vehicle (EV) Registration 108 of end user is coupled with mileage verification module 106 for accounting and managing the trading of carbon credits. An electric vehicle using an electric motor as a driving device is not widespread even though there is no carbon dioxide emission during traveling. Compared to an engine using fossil fuel, such as a long battery charge time and a short distance that can be fully charged, the electric vehicle is not sold because it is inconvenient and convenient.

However, if emissions trading with new added value can be done in automobiles, electric vehicles will have zero carbon dioxide emissions and will have a very strong advantage. Being able to feel a sense of superiority and status in emissions trading can give consumers an advantage over cars driven by fossil fuels. The reason is that the electric vehicle has only a small amount of carbon dioxide emission due to battery charging and the carbon dioxide emission amount is zero during driving. It is also advantageous if the emission limit for carbon dioxide emissions during the period is set for an automobile.

In the preferred embodiment, the Mileage Verification Module 106 calculates the mileage of the electric vehicle corresponding to the charging amount and the carbon emission amount of the electric vehicle corresponding to the mileage. Further, the mileage verification module 106 calculates the carbon emission reduction amount for the end user (having electric vehicle) by comparing the carbon emission amount of the electric vehicle and the carbon emission amount of the internal combustion engine vehicle. On the basis of this comparison it calculates the carbon credits earned by the end user. The carbon credits earned by the end user may be updated on the server 102 through the communication network 104. The carbon emission of the electric vehicle corresponding to the mileage can be calculated by: Carbon emissions from electric vehicles=(Charging amount×Electric vehicle fuel economy)×Electric vehicle carbon emission factor.

The total emissions rate is affected by a vehicle's efficiency (MPG and/or MPGe), electricity, and how that electricity is produced and distributed. This car's emissions rate in particular ZIP Code may be different than the average in the US because different fuel sources are used to produce electricity in different parts of the country. In case if the data is not there for the specific ZIP code then the US average is used.

In the embodiment of the present invention the Carbon Credit of EV vehicle earned is calculated as follows:

Upstream Emission—The Emission associated with the production and distribution of electricity. The emission of $CO_2$ varies by region and based on how the electricity is generated. For example, electricity generated from coal will result in higher $CO_2$ emission than electricity generated from renewable sources like wind and the like.

Total Emission of Gasoline Vehicle—It is the total $CO_2$ emissions by New Gasoline Vehicle.

Then, Total Saving of EV (like car, bike etc.) per KM=Total Emission of Gasoline Vehicle−Upstream emission.

Number of Carbon credit=(Total Saving of EV per KM*number of KM)/1,000,000.

In the above formulae the vehicle efficiency and upstream emission details will be obtained from the government databases and the total Emission of Gasoline Vehicle is the US average value.

In the present embodiment the carbon credit earned via mileage and KWh conversions, these units will have a "Crypto" equivalency. It can be issued 100 trillion Crypto tokens and this finite number will allow the crypto to appreciate till 2040. The idea is to use a percentage of this to support environmentally sustainable projects worldwide to reduce carbon emissions.

The trading of the carbon credits earned by the end users may be carried out on the present platform. The end users may simply access the platform of the present invention by registering themselves. After registration, the end users can access the platform by using login ID and password.

Preferably, the mileage verification module 106 comprises: a vehicle registration information unit that provides user's vehicle registration information; a vehicle model information unit providing vehicle model information including a vehicle model name, fuel efficiency, and carbon emission coefficient; a carbon credit price information unit that provides carbon credit price information. The mileage verification module 106 is linked with the server 102, which receives the carbon credit application and issues the carbon credit corresponding to the carbon emission reduction.

In addition, the mileage verification module 106 based on the electric vehicle charging amount according to one embodiment of the present invention and calculates the carbon emission reduction amount corresponding to the charging amount supplied to the electric vehicle in different ways. The mileage verification module 106 accumulates and manages the calculated carbon emission reduction for each user and a carbon credit manages carbon credits corresponding to carbon emission reductions for a plurality of users according to a preset standard.

According to the present invention, it provides a benefit to the user by securing the corresponding carbon credit as much as contributing to the reduction of carbon emissions by operating the electric vehicle. It is possible to receive economic benefits by operating the electric vehicle to individual users at the national level. It contributes to the spread and expansion of electric vehicles and has the effect of reducing environmental pollution problems.

According to an aspect of the present invention, it provides a platform for trading of energy saving using carbon credits. Referring to FIG. 1, the end user(s) having the renewable energy penal i.e. home solar 110 (solar panel) to fulfill its energy requirements. The home solar 110 is coupled to the KWH Confirmation Module 112 that calculates the power savings for each load from the power usage information for each load according to a predetermined criterion. Further, the KWH Confirmation Module 112 calculates the carbon emission reduction amount for the end user(s) (having home solar 110) by comparing the carbon emission amount of the home solar 110 and the carbon emission amount of the conventional electric power. On the basis of this comparison it calculates the carbon credits earned by the end user(s). The carbon credits earned by the end user may be updated on the server 102 through the communication network 104. The trading of the carbon credits earned by the end user(s) may be carried out on the present platform.

Similarly, the trading of carbon credits may be carried out by the different end user like institutional investors 114, companies 116 and external buyers 118. The server 102 may be configured as a web server, to allow users (e.g. individuals, institutional investors 114, companies 116 and external buyers 118) to connect, register, select carbon credits for purchase, and pay. The external buyers 118 may be different countries willing for trading of carbon credits. The external buyers 118 may trade directly by registering them on the platform or trade through the third party 120. Alternatively, other configurations are also possible, e.g. to enable communications between the end user's computer and the server's computer 102 by text message, email, or some other means.

Figure 2:
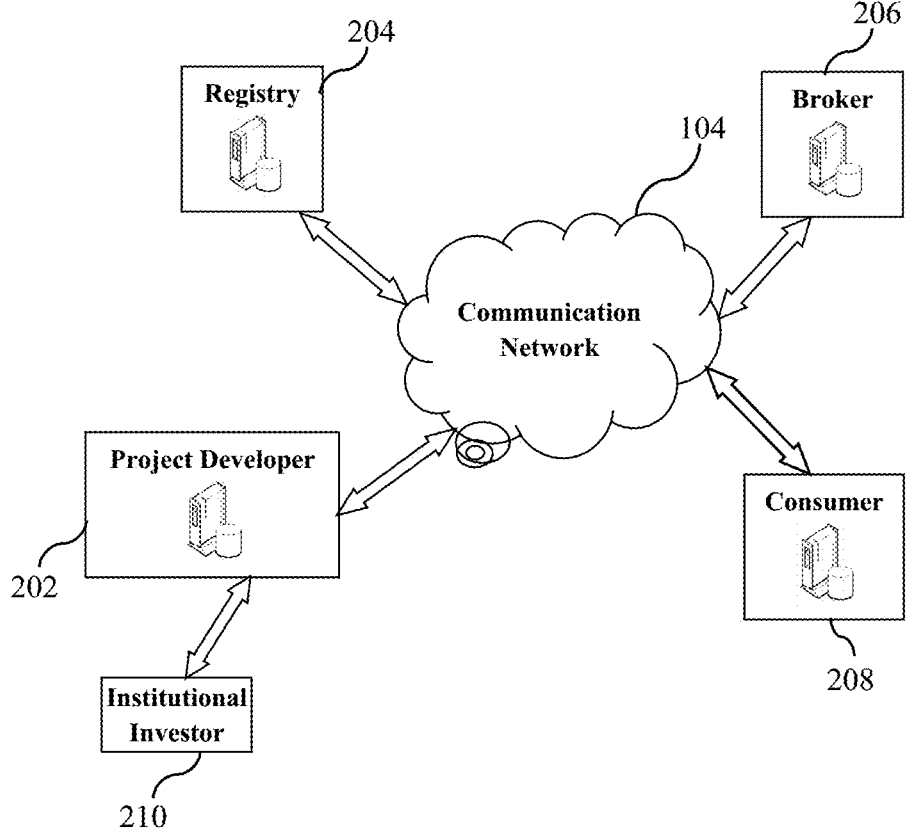
FIG. 2 is a schematic diagram of a computer network for trading of carbon credits.

FIG. 2 is a schematic diagram of a computer network for trading of carbon credits. An Institutional Investor 210, such as a company, generation plant or wind farm that generates energy with low or zero carbon emissions. A project developer 202 works with the owners of the institutional investor 210 to have it registered by a carbon credits registry 204 and awarded with carbon credits, e.g. a specific number of carbon credits per year or per month or some other time period, according to the amount of carbon emissions that may be offset by the project. The project developer typically gets to keep and sell a proportion of the carbon credits, and may also sell the carbon credits owned by the institutional investor 210 in exchange for a commission. The project developer's computer 202 and the carbon registry 204 are connected via network 104, such as the internet. A carbon broker or retailer's computer 206 is also connected to the internet, and the carbon broker or retailer may purchase carbon units and sell them onto consumers or to further brokers. A consumer's computer 208 is also shown as connected to the network, and the consumer may buy carbon units from a broker or retailer 206 (e.g. via a website).

Figure 3:
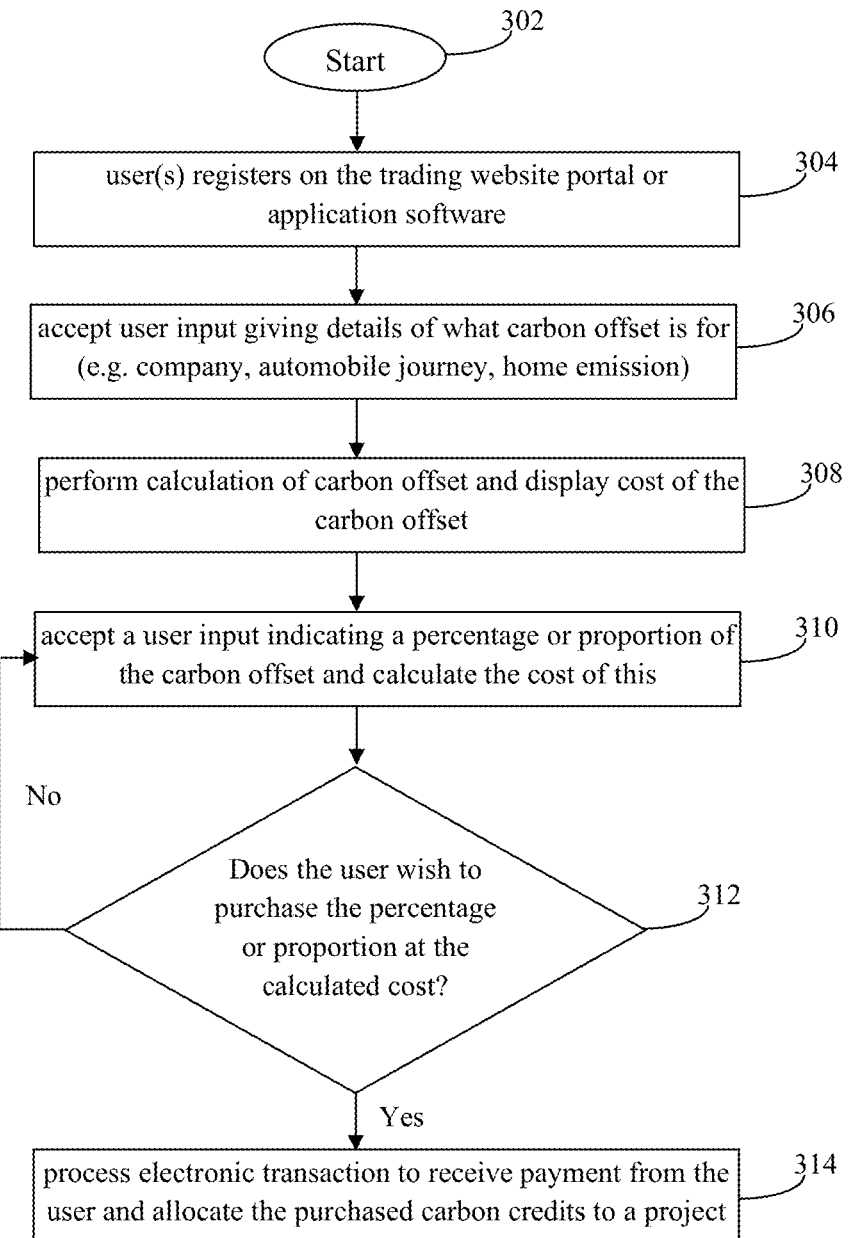
FIG. 3 is a flowchart showing a process implemented by the current platform according to an embodiment of the present invention.

FIG. 3 is a flowchart showing a process implemented by the current platform according to an embodiment of the present invention. The process starts at step 302. At the next step, 304, user(s) registers on the trading website portal or application software using its computer/device. The website may include marketing material such as information, photos and/or a video of the carbon project. The project information may include information about the project type, partner, location, carbon standard, project status, portfolio, and relevant documents.

At step 306, the carbon web server receives data from the end user giving details of what the carbon offset is for. This allows the carbon footprint to be calculated, which occurs at step 308. The website may include an in-built carbon calculator, or it may be linked to a carbon calculator via a network connection. In some embodiments, an existing carbon vender's method may be used to calculate the number of carbon units, and additional code may be provided to convert this existing system to an embodiment of the present invention.

After calculating the carbon offset, and displaying this on the user's or consumer's computer, at step 310, the consumer is given an opportunity to indicate or modify a percentage or proportion of the carbon cost that they wish to pay. The new modified cost is re-calculated at step 312 and if the consumer approves the bill, the process continues to step 314. If the consumer does not approve the bill, the process goes back to step 310.

In an implementation, a user carbon credits will be computed and the user may register in a 3rd party registry and added to their account. The user can choose to either sell all or part of their credits or keep accumulating the partial or all their credits.

At step 314, an electronic transaction is processed to receive the payment from the user and then the purchased carbon units can be allocated to the selected project. Standard online payment methods may be used to pay for the carbon credits, e.g. credit cards, debit cards, PayPal, crypto currency, etc. In some embodiments, a user may be required to login before purchasing carbon credits, but in other embodiments, this is not necessary. The server may store and monitor the number of carbon units in stock from each project, and/or the number of carbon units that have been bought. Carbon credits may be retired when the purchased amounts from one or more customers adds up to at least a whole carbon unit. In some cases, it is more preferable to retire the carbon units in blocks. However, if a number of consumers are each buying only a fraction of a carbon credit, then an aggregation of the purchased fractions of units can be performed, before the units can be retired.

The embodiment of the present invention provides a platform to allow trading between all kinds of digital assets, improving liquidity and making it easy for buyers to do the transaction in any currency. Since the transactions uses blockchain technology in a decentralized way so that no single organisation or group has control over trading rather, all users in this network collectively retain control. The speed of transaction can be achieved between 3-5 seconds which is faster in any blockchain platform. The $CO_2$ usage per transaction is very less compared to all transaction based platform which is so special for the current platform.

In other aspects of the invention, small fractions of carbon units are deliberately sold to a large number of users, and the fractions of carbon units are aggregated to allow a broker to purchase and then retire whole carbon credits.

Figure 4:
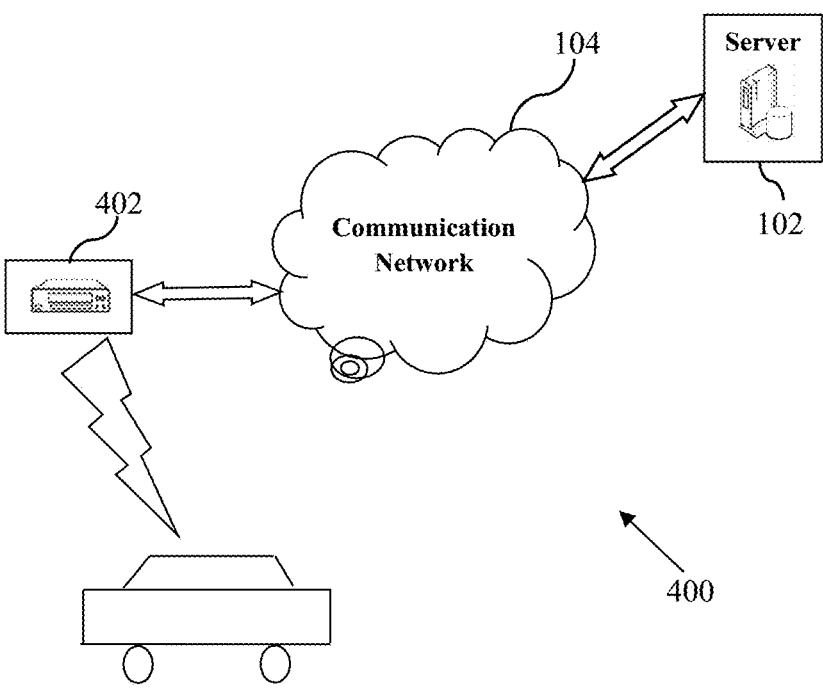
FIG. 4 illustrates a system for converting greenhouse gas emissions into carbon credit according to another aspect of the present invention.

FIG. 4 illustrates a system 400 for converting greenhouse gas emissions into carbon credit according to another aspect of the present invention. As illustrated in this drawing, the system for converting greenhouse gas emissions into carbon credit according to the present invention includes a carbon emission reduction device 402 and a carbon credit management server 102.

The carbon emission reduction device 402 detects the amount of fuel fed into a vehicle and the amount of fuel used by the vehicle, minimizes the supply of fuel to the engine of the vehicle to prevent fuel consumption due to idling and suppress carbon emission when the vehicle does not move within a preset time period, normalizes the supply of fuel to the engine of the vehicle when the vehicle is moved depending on detection of the acceleration pedal of the vehicle, generates carbon dioxide reduction information by adding or subtracting the amount of carbon dioxide whose emission is suppressed during an idling prevention time period to or from the amount of carbon dioxide emitted from the vehicle, and converts the carbon dioxide reduction information into carbon credit which has an economic value generated upon reduction of 1 ton of carbon emissions. This device includes a fuel information management module, an idling limitation module, a carbon dioxide reduction calculation module, a carbon credit conversion module, a carbon credit authentication module and a carbon credit trading module.

Specifically, the fuel information management module of the carbon emission reduction device 402 detects the kind and amount of fuel fed into a vehicle to generate measurement information on an amount of fuel fed, detects the amount of fuel consumed by movement of the vehicle to generate measurement information on an amount of fuel used, and stores and manages such information.

The measurement information on the amount of fuel fed is preferably understood to include vehicle model data, fuel model data, vehicle travel time data, and data for an amount of fuel fed into the fuel storage space of a vehicle, but the present invention is not limited thereto.

Furthermore, the fuel information management module receives preset oil company information and additional oil company information upon supply of fuel to a vehicle and stores and manages the information, and also receives preset credit card company information and additional credit card company information upon payment of fuel fed into the vehicle and stores and manages the information.

Meanwhile, the idling limitation module minimizes the supply of fuel to the engine of a vehicle to prevent fuel consumption due to idling and suppress carbon emission when the vehicle does not move within a preset time period depending on the detection of the acceleration pedal of the vehicle, and normalizes the supply of fuel to the engine of the vehicle when the vehicle is moved depending on the detection of the acceleration pedal of the vehicle.

As such, it is preferably understood that minimizing the supply of fuel means that the fuel is supplied to the engine of the vehicle to the extent that startup is not stopped, and normalizing the supply of fuel means that the fuel is supplied to the engine of the vehicle in proportion to decompression of the acceleration pedal so as to enable the vehicle to travel.

The carbon dioxide reduction calculation module generates carbon dioxide reduction information by adding or subtracting the amount of carbon dioxide whose emission is suppressed during an idling limitation time period by means of the idling limitation module to or from the amount of carbon dioxide emitted from the vehicle.

The carbon credit trading module transmits user identification data, vehicle identification data, user account data and carbon credit trading request information, which are input by a user, to the carbon credit server 102, along with the carbon credit and checks whether a carbon credit trading price is added via inquiry of the preset user account data.

The carbon credit trading request information includes any one selected from among trading quantity data, trading price data, trading agency data and trading company data, regarding the carbon credit to be traded by the user.

In another embodiment of the of the present invention a trading platform, system, and method for trading and accounting for environmental offsets, for example, mandatory and/or voluntary carbon emission offsets trading is provided. It provides embodiments of a trading platform which creates and facilitates the trading of carbon credit depositary receipts and which consolidates a variety of market and pricing data. Also, it provides embodiments directed to a computer-implemented trading platform, method, and computer-readable medium that facilitates the trading and eventually the retirement of carbon offsets between buyers and sellers.

Figure 5:
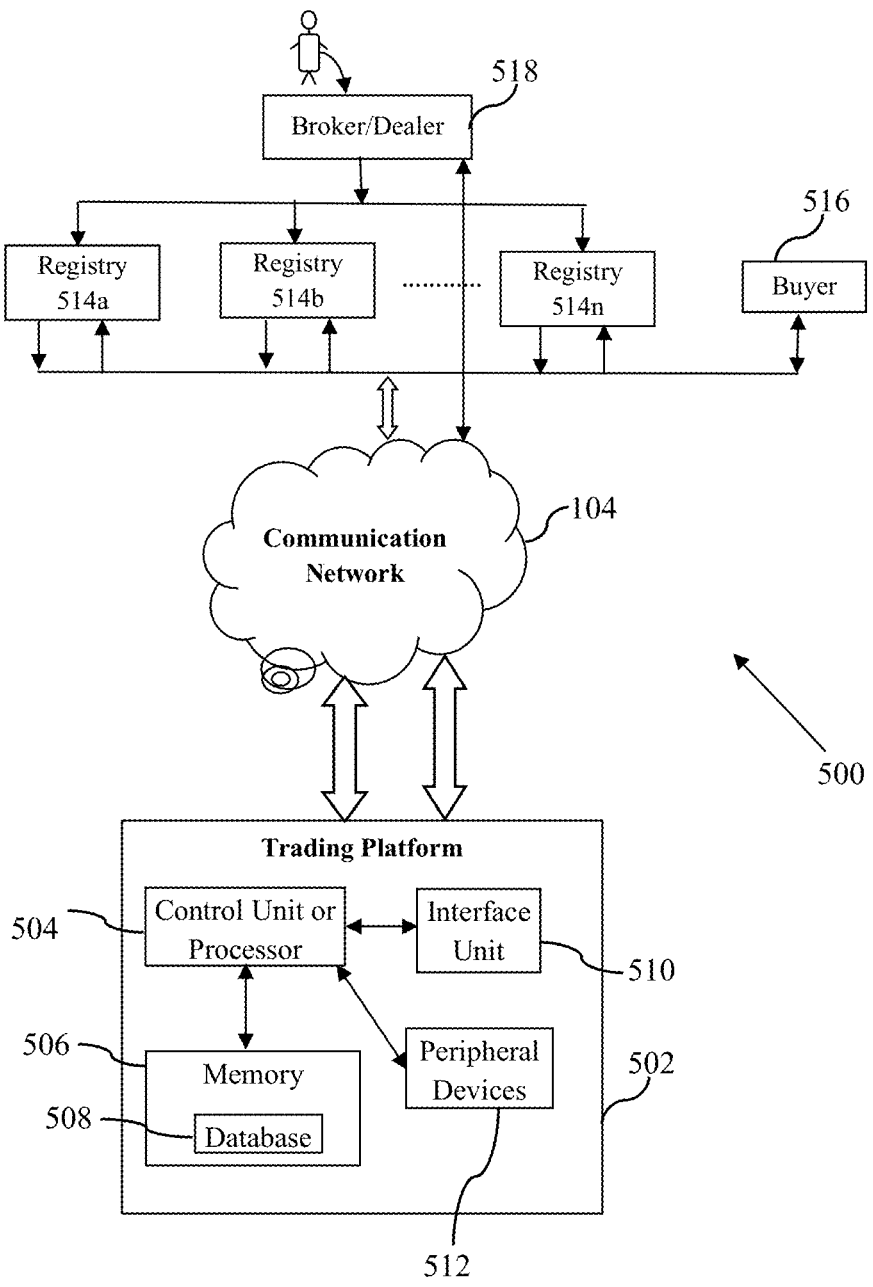
FIG. 5 shows a trading system encompasses the various factors that may be involved with the creation, trading and retirement of equalized environmental offset credits of another embodiments of the invention.

FIG. 5 shows a trading system 500 encompasses the various factors that may be involved with the creation, trading and retirement of equalized environmental offset credits of another embodiments of the invention. Mediator 518 (for example an investment bank or broker/dealer) negotiates with companies that possess environmental credits (e.g., carbon credits) that may or may not be registered with one or more national registries 514a, 514b . . . 514n (i.e., mandatory offsets versus voluntary offsets). Mediator 518 represent entities that either facilitate identification of emission offsets and/or project(s) where emission offsets might be available or appropriate, and assists, in some situations, in bringing a buyer and seller together to conduct a trade of an emission offset. Purchases of outstanding offset credits may be made via computer implemented trading means, e.g., over an communication network 104 in a known manner through appropriate computer network interfaces using, for example, the Internet and TCP/IP communication protocols, or through a private network. The interface with registries 514a, 514b . . . 514n may not be applicable to all offset trades, but may be applicable only to offsets traded under a mandatory or regulated scheme, or under a voluntary scheme with a pre-existing registry. This depiction of a national registry may also represent such a pre-existing voluntary registry.

Trading platform 502 may be connected electronically to mediator 518 via network 104. Trading platform 502 may include control unit or processor 504, memory device(s) 506 which may contain database 508, e.g., a structured database. Control Unit 504 may be part of a personal computer, computer workstation, or mainframe computer, and may also represent multi-processor configurations useful, with proper programming, to improve processing speed.

Memory device(s) 506 may be known types of solid-state memory such as dynamic random access memory (DRAM) that stores information, including information formatted for storage in structured database 508. Memory 506 may be backed up by known redundant storage media, e.g., tape backup (not shown). Structured database 508 may be implemented as a Structured Query Language (SQL) database or other type of known database format that is compatible or desired to be used with the particular software programming approach used to implement the trade platform. Structured database 508 may be configured to store information including information relating to multiple investors, multiple offset projects and associated offset units, multiple mediators 518, the status of any previously traded and/or expired voluntary offset in a registry-type format, any national registry associated with a mandatory or regulated offset scheme, and the custodian of any related securitized offset.

Interface 510 may be implemented by any number of conventional input/output and/or display devices, e.g., mouse, keyboard, touch screen, etc. Peripheral Devices 512 represent other conventional computer peripheral devices such as displays, printers, additional and/or mass storage devices, and scanner. Buyer 516 is a pollution emitter may buy the carbon credits or securities. The manager of trading platform 502 may charge a depository service fee for services related to registration, custody, and/or trading and buyer/emitter 516 may buy the carbon credits/units and retire the underlying credit (e.g., retire the credit with registry 514). Alternatively, a buyer may resell the carbon credits to another purchaser.

In another aspect of the present invention the trading platform 502 may electronically interface with one or more securities exchange via a private network/communications channel, or over network 104. Precautions necessary to ensure the privacy and security of electronic data exchanged between parties may be taken in any number of known ways. Trading platform 502 may also electronically interface with central securities depository via a private network/communications channel, or over network 104.

Figure 6:
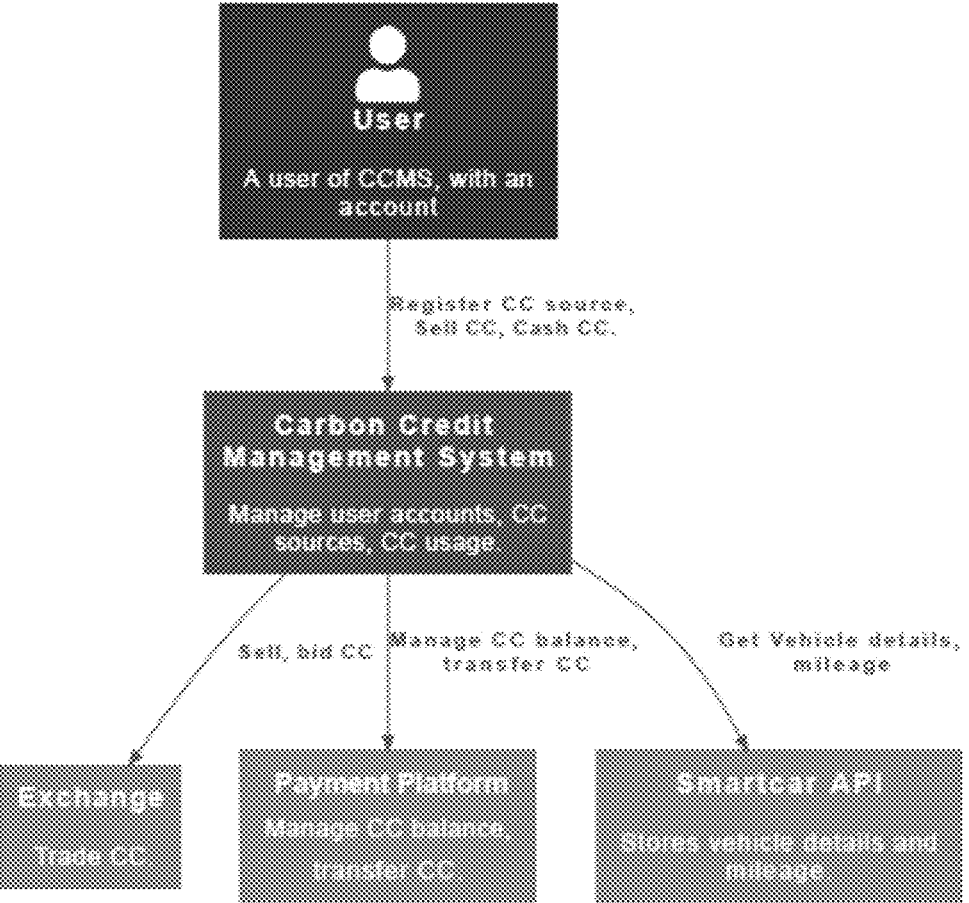
FIG. 6 shows a broad level Carbon Credit Management System according to another aspect of the present invention.
Figure 7:
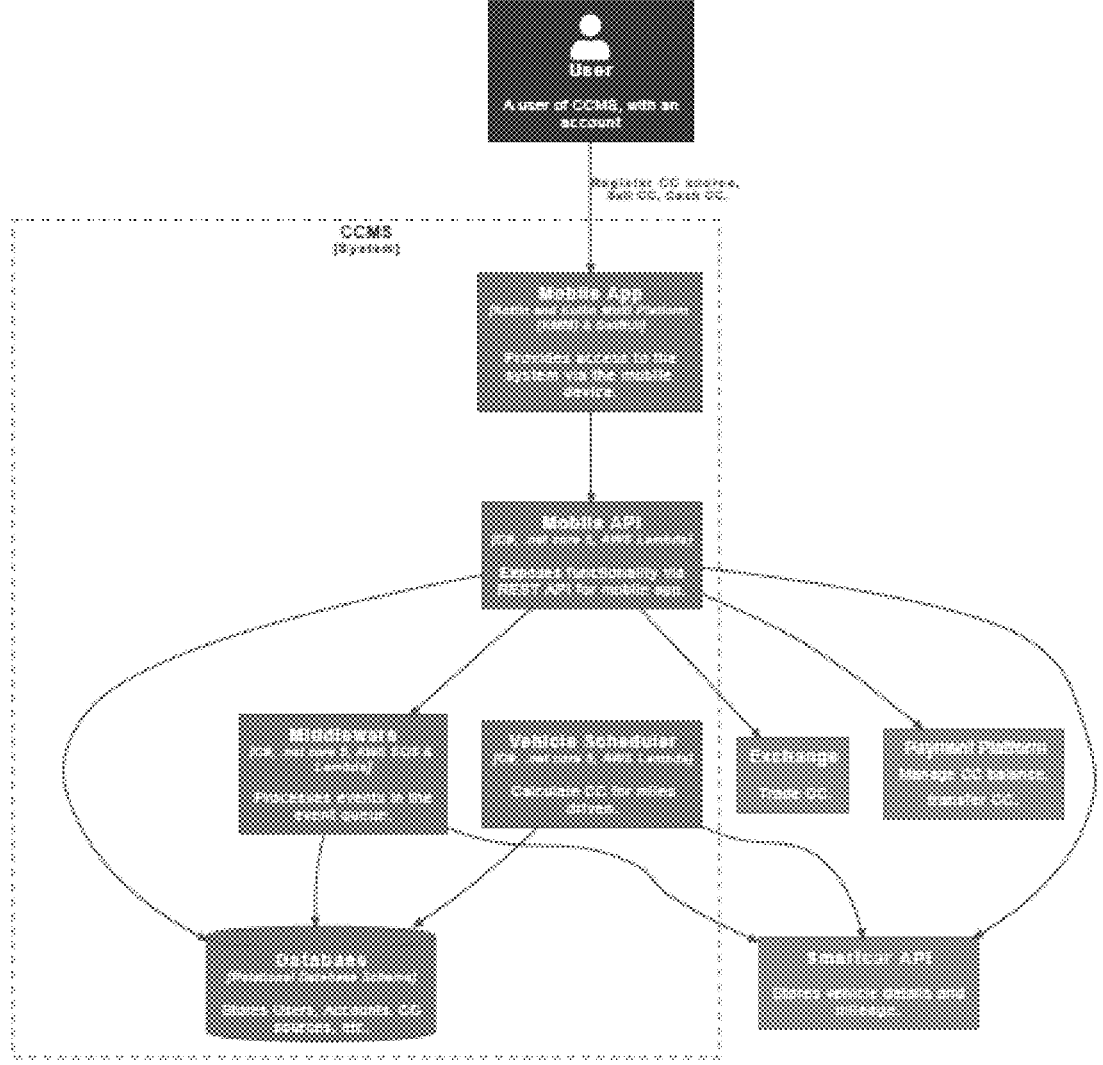
FIG. 7 shows high level software architecture for Carbon Credit Management System according to another aspect of the present invention.

In another embodiment of the present invention, the server 102 or trading platform 502 may receive carbon emissions acquisition data indicative of an allowance of carbon emissions. The server 102 or trading platform 502 may generate token data based on the received carbon emissions acquisition data, wherein the token data is associated with a portion of the allowance of carbon emissions and includes a use indicator and an ownership indicator. The trading platform 502 may store the token data to a distributed transaction ledger, wherein a redemption transaction that updates the distributed transaction ledger is configured to alter the use indicator of the token data. A broad level Carbon Credit Management System is illustrated in FIG. 6. FIG. 7 shows a high level software architecture for Carbon Credit Management System according to another aspect of the present invention FIG. 8 shows a computer-implemented method 800 according to another aspect of the present invention. The method 800 includes of:

Step 802 relates to communicating, by at least one computing device comprising at least one hardware processor, with a plurality of vehicles over a communication network. The at least one computing device is communicated with a plurality of home internet-of-thing (IoT) devices over a communication network. The home IoT devices being associated with a renewable energy source. The respective one of the home IoT devices is configured to monitor solar energy, and the renewable energy source is solar power. The at least one computing device is at least one server computing device.

Step 804 relates to receiving, by the at least one computing device, distance information from a respective one of the vehicles detailing distance traveled by the respective one of the vehicles. The at least one computing device receives energy usage information from a respective one of the home IoT devices detailing energy usage of a respective home. The respective one of the home IoT devices is configured to monitor solar energy, and the renewable energy source is solar power.

Step 806 relates to generating, by the at least one computing device, a carbon credit based at least in part on the distance information received from the respective one of the vehicles. The at least one computing device generates a second carbon credit based at least in part on the energy usage information received from the respective home. The respective one of the home IoT devices is configured to monitor solar energy, and the renewable energy source is solar power. The at least one computing device generates a cryptocurrency token based at least in part on the carbon credit. The at least one computing device transmits a request to a third-party verification server that verifies and certifies the carbon credit, the third-party verification server being operated by an entity separate form that of the server computing device. The at least one computing device receives a request from the client device associated with the user account to offer the carbon credit in a carbon credit exchange in which third-parties can generate a request to obtain the carbon credit; and in response to the request to obtain the carbon credit being received from a third-party user account of the carbon credit exchange, transferring, by the at least one computing device, the carbon credit to the third-party user account.

Step 808 relates to associating, by the at least one computing device, the carbon credit with a user account associated with the respective one of the vehicles. The at least one computing device further associates the carbon credit with a user account associated with the respective home. The respective one of the home IoT devices is configured to monitor solar energy, and the renewable energy source is solar power. The at least one computing device stores information associated with the cryptocurrency token in a blockchain distributed ledger. The at least one computing device makes the cryptocurrency token available in a third-party cryptocurrency exchange.

In an embodiment, the method 800 includes of displaying, by the at least one computing device, the carbon credit in a display device of a client device in response to a login of the user account associated with the respective one of the vehicles being performed on the client device.

FIG. 9 shows a block diagram for working between vehicle 906 and a system 900 through communication network 904 according to another aspect of the present invention. The system 900 includes a server computing device 902 comprising at least one hardware processor 902a and memory 902b; program instructions stored in the memory 902b and executable in the server computing device 902 that, when executed, direct the server computing device 902 to communicate with a plurality of vehicles over the communication network 904. The server computing device 902 is further directed to communicate with a plurality of home internet-of-thing (IoT) devices 910 over the communication network 904, the home IoT devices being associated with a renewable energy source 912. The respective one of the home IoT devices 910 is configured to monitor solar energy, and the renewable energy source 912 is solar power.

The server computing device 902 is further directed to receive distance information from a respective one of the vehicles detailing distance traveled by the respective one of the vehicles 906. The server computing device 902 is further directed to receive energy usage information from a respective one of the home IoT devices 910 detailing energy usage of a respective home. In an implementation, the distance information and/or energy usage information is received based on the usage over a predetermined time period.

The server computing device 902 is further directed to generate a carbon credit based at least in part on the distance information received from the respective one of the vehicles 906. The server computing device 902 is further directed to generate the carbon credit based at least in part on a carbon emission from the respective one of the vehicles, and wherein the carbon emission is computed based at least in part on a charging amount, fuel economy of the vehicle, and a carbon emission factor. The server computing device 902 is further directed to generate a second carbon credit based at least in part on the energy usage information received from the respective home. The server computing device 902 is further directed to transmit a request to a third-party verification server that verifies and certifies the carbon credit, the third-party verification server being operated by an entity separate form that of the server computing device 902. The server computing device 902 is further directed to receive a request from a client device associated with a user account to offer the carbon credit in a carbon credit exchange in which third-parties can generate a request to obtain the carbon credit; and in response to the request to obtain the carbon credit being received from a third-party user account of the carbon credit exchange, transfer the carbon credit to the third-party user account. The server computing device 902 is further directed to generate a cryptocurrency token based at least in part on the carbon credit. The server computing device 902 is further directed to store information associated with the cryptocurrency token in a block-chain distributed ledger. The server computing device 902 is further directed to make the cryptocurrency token available in a third-party cryptocurrency exchange.

The server computing device 902 is further directed to associate the carbon credit with a user account associated with the respective one of the vehicles 906. The server computing device 902 is further directed to associate the carbon credit with a user account associated with the respective home. The server computing device 902 is further directed to display the carbon credit in a display device of a client device in response to a login of the user account associated with the respective one of the vehicles 906 being performed on the client device.

In one aspect of the present invention, a vehicle computing device 908 comprising at least one hardware processor 908a and memory 908b; program instructions stored in the memory and executable in the vehicle computing device 908 that, when executed, direct the vehicle computing device 908 to: communicate with a server computing device 902 over a communication network 904; generate distance information detailing distance traveled by the vehicle 906. The vehicle computing device 908 configured to transmit the distance information to the server computing device 902 over the communication network 904.

The vehicle computing device 908 configured to associate a carbon credit generated at least in part on the distance information with a user account associated with the vehicle 906. The vehicle computing device 908 is further directed to receive an acknowledgement from a third-party verification server that the carbon credit has been verified and certified, the third-party verification server being operated by an entity separate form that of the server computing device or the vehicle computing device 908. The vehicle computing device 908 is further directed to receive an acknowledgment from the server computing device 902 that a cryptocurrency token has been generated based at least in part on the carbon credit. The vehicle computing device 908 is further directed to display the carbon credit in a display device of a client device or the vehicle 906 in response to a login of the user account associated with the vehicle being performed on the client device or the vehicle 906. The vehicle computing device 908 is further directed to receive an indication that the carbon credit was generated by the server computing device 902 based at least in part on the distance information received from the vehicle 906.

For additional details relating to the present invention, materials and manufacturing techniques of the level of ordinary skill in the art can be used. The same may be true for aspects based on the method of the present invention with respect to additional actions commonly or logically used.

Also, optional features of the described variations of the invention can be described and claimed independently or in combination with any one or more of the features described herein. Similarly, a reference to a singular element includes the possibility that there are pluralities of the same element. More specifically, the singular form ("a," "and," "said," and "the") is not expressly required by the context as used herein.

Therefore, this statement should serve as a preceding basis for the use of exclusive terms such as "simply", "only", etc. or "negative" limitation in connection with the description of the elements is intended. Unless defined otherwise herein, all technical and scientific terms used herein have the same meaning as commonly understood by one of ordinary skill in the art to which this invention belongs.

The invention claimed is:

1. A system, comprising:

a server computing device comprising at least one hardware processor and memory; program instructions stored in the memory and executable in the server computing device that, when executed, direct the server computing device to:

communicate with a plurality of vehicles over a communication network;

receive a distance information from a respective one of the vehicles detailing distance travelled by the respective one of the vehicles;

generate a carbon credit based at least in part on the distance information received from the respective one of the vehicles; and associate the carbon credit with a user account associated with the respective one of the vehicles;

generate the carbon credit based at least in part on a carbon emission from the respective one of the vehicles, wherein the carbon emission is computed based on at least in part on a charging amount, fuel economy of the vehicle and a carbon emission factor, wherein the server computing device is further configured to detect an amount of fuel fed into the vehicles and the amount of fuel used by the vehicles by movement of the vehicle to generate measurement information, wherein the measurement information includes a vehicle model data, a fuel model data, a vehicle travel time data and a fuel storage space of the vehicle;

minimize a supply of fuel to an engine of the vehicles to prevent fuel consumption due to idling and suppress carbon emission when the vehicle does not move within a pre-set time period, normalize the supply of fuel to the engine of the vehicle when the vehicle is moved depending on detection of an acceleration pedal of the vehicles and generate carbon dioxide reduction information by adding and subtracting an amount of carbon dioxide whose emission is suppressed during an idling prevention time period to and from the amount of carbon dioxide emitted from the vehicles and convert the carbon dioxide reduction information into the carbon credit; and calculate a mileage of the vehicle corresponding to a charging amount and the carbon emission amount of the vehicle corresponding to the mileage, wherein the server computing device configured to calculate the carbon emission reduction amount for the vehicle by comparing the carbon emission amount of the vehicle and the carbon emission amount of the internal combustion engine of the vehicle and calculate the carbon credits earned by the vehicle on basis of the comparison.

2. The system of claim 1, wherein the server computing device is further directed to:

transmit a request to a third-party verification server that verifies and certifies the carbon credit, the third-party verification server being operated by an entity separate from that of the server computing device.

3. The system of claim 1, wherein the server computing device is further directed to:

receive a request from a client device associated with the user account to offer the carbon credit in a carbon credit exchange in which third-parties can generate a request to obtain the carbon credit; and in response to the request to obtain the carbon credit being received from a third-party user account of the carbon credit exchange, transfer the carbon credit to the third-party user account.

4. The system of claim 1, wherein the server computing device is further directed to:

generate a cryptocurrency token based at least in part on the carbon credit, and wherein the server computing device is further directed to: store information associated with the cryptocurrency token in a blockchain distributed ledger.

5. The system of claim 4, wherein the server computing device is further directed to:

make the cryptocurrency token available in a third-party cryptocurrency exchange.

6. The system of claim 1, wherein the server computing device is further directed to generate the carbon credit based on at least in part on the distance information received from the respective one of the vehicles over a period of time.

7. The system of claim 1, wherein the server computing device is further directed to:

communicate with a plurality of home internet-of-thing (IoT) devices over the communication network, the home IoT devices being associated with a renewable energy source;

receive energy usage information from a respective one of the home IoT devices detailing energy usage of a respective home;

generate a second carbon credit based at least in part on the energy usage information received from the respective home; and associate the carbon credit with the user account associated with the respective home.

8. The system of claim 7, wherein the respective one of the home IoT devices is configured to monitor solar energy, and the renewable energy source is solar power.

9. The system of claim 1, wherein the server computing device is further directed to:

display the carbon credit in a display device of a client device in response to a login of the user account associated with the respective one of the vehicles being performed on the client device.

10. A vehicle, comprising: a vehicle computing device comprising at least one hardware processor and memory; program instructions stored in the memory and executable in the vehicle computing device that, when executed, direct the vehicle computing device to:

communicate with a server computing device over a communication network;

generate distance information detailing distance travelled by the vehicle;

transmit the distance information to the server computing device over the communication network; and associate a carbon credit generated at least in part based on the distance information with a user account associated with the vehicle;

generate the carbon credit based at least in part on a carbon emission from the respective one of the vehicles, wherein the carbon emission is computed based on at least in part on a charging amount, fuel economy of the vehicle and a carbon emission factor, wherein the vehicle computing device is further configured to detect an amount of fuel fed into the vehicles and the amount of fuel used by the vehicles by movement of the vehicle to generate measurement information, wherein the measurement information includes a vehicle model data, a fuel model data, a vehicle travel time data and a fuel storage space of the vehicle;

minimize a supply of fuel to an engine of the vehicles to prevent fuel consumption due to idling and suppress carbon emission when the vehicle does not move within a pre-set time period, normalize the supply of fuel to the engine of the vehicle when the vehicle is moved depending on detection of an acceleration pedal of the vehicles and generate carbon dioxide reduction information by adding and subtracting an amount of carbon dioxide whose emission is suppressed during an idling prevention time period to and from the amount of carbon dioxide emitted from the vehicles and convert the carbon dioxide reduction information into the carbon credit; and calculate a mileage of the vehicle corresponding to a charging amount and the carbon emission amount of the vehicle corresponding to the mileage, wherein the vehicle computing device configured to calculate the carbon emission reduction amount for the vehicle by comparing the carbon emission amount of the vehicle and the carbon emission amount of the internal combustion engine of the vehicle and calculate the carbon credits earned by the vehicle on basis of the comparison.

11. The vehicle of claim 10, wherein the vehicle computing device is further directed to: receive an acknowledgement from a third-part-v verification server that the carbon credit has been verified and certified, the third-party verification server being operated by an entity separate form that of the server computing device or the vehicle computing device.

12. The vehicle of claim 10, wherein the vehicle computing device is further directed to: receive an acknowledgment from the server computing device that a cryptocurrency token has been generated based at least in part on the carbon credit.

13. The vehicle of claim 10, wherein the vehicle computing device is further directed to display the carbon credit in a display device of a client device or the vehicle in response to a login of the user account associated with the vehicle being performed on the client device or the vehicle.

14. The vehicle of claim 10, wherein the vehicle computing device is further directed to receive an indication that the carbon credit was generated by the server computing device based at least in part on the distance information received from the vehicle.

15. A computer-implemented method, comprising:

communicating, by at least one computing device comprising at least one hardware processor, with a plurality of vehicles over a communication network;

receiving, by the at least one computing device, distance information from a respective one of the vehicles detailing distance travelled by the respective one of the vehicles;

generating, by the at least one computing device, a carbon credit based at least in part on the distance information received from the respective one of the vehicles; and associating, by the at least one computing device, the carbon credit with a user account associated with the respective one of the vehicles;

generating the carbon credit based at least in part on a carbon emission from the respective one of the vehicles, wherein the carbon emission is computed based on at least in part on a charging amount, fuel economy of the vehicle and a carbon emission factor, wherein the at least one computing device is further configured to detect an amount of fuel fed into the vehicles and the amount of fuel used by the vehicles by movement of the vehicle to generate measurement information, wherein the measurement information includes a vehicle model data, a fuel model data, a vehicle travel time data and a fuel storage space of the vehicle;

minimizing a supply of fuel to an engine of the vehicles to prevent fuel consumption due to idling and suppress carbon emission when the vehicle does not move within a pre-set time period, normalize the supply of fuel to the engine of the vehicle when the vehicle is moved depending on detection of an acceleration pedal of the vehicles and generate carbon dioxide reduction information by adding and subtracting an amount of carbon dioxide whose emission is suppressed during an idling prevention time period to and from the amount of carbon dioxide emitted from the vehicles and convert the carbon dioxide reduction information into the carbon credit; and calculating a mileage of the vehicle corresponding to a charging amount and the carbon emission amount of the vehicle corresponding to the mileage, wherein the at least one computing device configured to calculate the carbon emission reduction amount for the vehicle by comparing the carbon emission amount of the vehicle and the carbon emission amount of the internal combustion engine of the vehicle and calculate the carbon credits earned by the vehicle on basis of the comparison.

16. The computer-implemented method of claim 15, further comprising:

transmitting, by the at least one computing device, a request to a third-party verification server that verifies and certifies the carbon credit, the third-party verification server being operated by an entity separate from that of the at least one computing device.

17. The computer-implemented method of claim 15, further comprising:

receiving, by the at least one computing device, a request from a client device associated with the user account to offer the carbon credit in a carbon credit exchange in which third-parties can generate a request to obtain the carbon credit; and in response to the request to obtain the carbon credit being received from a third-party user account of the carbon credit exchange, transferring, by the at least one computing device, the carbon credit to the third-party user account.

18. The computer-implemented method of claim 17, further comprising generating, by the at least one computing device, a cryptocurrency token based at least in part on the carbon credit.

19. The computer-implemented method of claim 18, further comprising storing, by the at least one computing device, information associated with the cryptocurrency token in a blockchain distributed ledger.

20. The computer-implemented method of claim 19, further comprising making, by the at least one computing device, the cryptocurrency token available in a third-party cryptocurrency exchange.

21. The computer-implemented method of claim 15, further comprising:

communicating, by the at least one computing device, with a plurality of home interne-of-thing (IoT) devices over the communication network, the home IoT devices being associated with a renewable energy source;

receiving, by the at least one computing device, energy usage information from a respective one of the home IoT devices detailing energy usage of a respective home;

generating, by the at least one computing device, a second carbon credit based at least in part on the energy usage information received from the respective home; and associating, by the at least one computing device, the carbon credit with a user account associated with the respective home.

22. The computer-implemented method of claim 21, wherein the respective one of the home IoT devices is configured to monitor solar energy, and the renewable energy source is solar power.

23. The computer-implemented method of claim 15, wherein the at least one computing device is at least one server computing device.

24. The computer-implemented method of claim 15, further comprising displaying, by the at least one computing device, the carbon credit in a display device of a client device in response to a login of the user account associated with the respective one of the vehicles being performed on the client device.

* * * * *